United States Patent
Ray

(10) Patent No.: US 8,838,080 B2
(45) Date of Patent: Sep. 16, 2014

(54) METHODS AND APPARATUS FOR CONTEXT-BASED COMMUNICATIONS THROUGH VISUALIZATION

(75) Inventor: Rajarshi Ray, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 532 days.

(21) Appl. No.: 12/841,911

(22) Filed: Jul. 22, 2010

(65) Prior Publication Data

US 2011/0021180 A1    Jan. 27, 2011

Related U.S. Application Data

(60) Provisional application No. 61/228,054, filed on Jul. 23, 2009.

(51) Int. Cl.
*H04L 29/08*    (2006.01)
*G06F 9/44*    (2006.01)
*G09B 5/00*    (2006.01)

(52) U.S. Cl.
CPC ............... *G06F 9/4446* (2013.01); *G09B 5/00* (2013.01)
USPC ...... 455/414.4; 455/440; 455/466; 455/414.1; 455/418; 345/633; 345/156; 345/419; 345/634

(58) Field of Classification Search
CPC ......... G06F 3/011; G06F 3/013; G06F 3/005; G06F 3/017; G06F 1/163; G06F 19/3437; G06F 19/345; G06F 19/363; G06F 3/0304; G06F 17/00; G06F 19/321; G06F 19/322; G06F 19/3481; G02B 27/0093; G02B 27/014
USPC ............... 701/207; 455/414.1, 466, 440, 441, 455/418; 345/633, 156, 419, 158, 634; 348/46, 207.1, 14.08, 49; 382/128
See application file for complete search history.

(56) References Cited

U.S. PATENT DOCUMENTS

| | | | |
|---|---|---|---|
| 6,501,421 | B1 | 12/2002 | Dutta et al. |
| 2005/0124375 | A1 | 6/2005 | Nowosielski |
| 2005/0159141 | A1 | 7/2005 | Osborn, Jr. |
| 2006/0223518 | A1* | 10/2006 | Haney ........................... 455/420 |
| 2007/0219708 | A1* | 9/2007 | Brasche et al. ................ 701/207 |
| 2007/0222746 | A1* | 9/2007 | LeVine ......................... 345/156 |
| 2008/0111832 | A1* | 5/2008 | Emam et al. .................. 345/633 |
| 2009/0038468 | A1 | 2/2009 | Brennan |
| 2009/0138113 | A1 | 5/2009 | Hoguet |
| 2009/0316951 | A1* | 12/2009 | Soderstrom ................... 382/103 |
| 2010/0328344 | A1* | 12/2010 | Mattila et al. ................. 345/633 |

OTHER PUBLICATIONS

International Search Report and Written Opinion—PCT/US2010/043149, International Search Authority—European Patent Office—Oct. 5, 2010.

* cited by examiner

*Primary Examiner* — Quan M Hua
(74) *Attorney, Agent, or Firm* — Abdollah Katbab

(57) ABSTRACT

Apparatus and methods for providing visualization, which may be provided with Augmented Reality, illustrating information for a procedure on a wireless device include identifying and presenting a visualization scenario, such as a video and/or an animation illustrating the desired procedure to educate an user or provide guidance to an user to help him deal with his current context. The apparatus and methods also include revising the visualization scenario based upon an occurrence of an event that changes and/or alters the visualization scenario in a dynamic and adaptive manner.

63 Claims, 9 Drawing Sheets

METHODS AND APPARATUS FOR CONTEXT-BASED COMMUNICATIONS THROUGH VISUALIZATION

CLAIM OF PRIORITY UNDER 35 U.S.C. §119

The present application for patent claims priority to Provisional Application No. 61/228,054 entitled "Methods and Apparatus for Providing Unified Socially Interactive Community" filed Jul. 23, 2009, and assigned to the assignee hereof and hereby expressly incorporated by reference herein.

BACKGROUND

1. Field

The following relates generally to wireless communications and, more particularly, to providing visualizations, such as animations or video clips for a procedure on a mobile device, which may be provided with features and/or characteristics related to augmented reality.

2. Background

In today's world, wireless communication systems are widely deployed to provide various types of content, including voice, video, music, text and data, for example. Wireless devices, such as cellular telephones or handheld devices having wireless connection capability are deployed leveraging the wireless communication system by users for communicating and interacting with each other. Wireless devices may also be used to provide users with educational information or guidance and instructions for performing a procedure, such as changing a tire of an automobile, for example. These instructions, however, are typically step-by-step instructions in the form of text and/or static pictures. Moreover, these instructions typically do not include additional information and/or alternative instructions if an unexpected event occurs during the process, changing the desired procedure or its context. Thus, it would be advantageous for users of wireless devices to receive updated instructions for performing procedures based upon occurrence of events that change and/or alter the procedure while the user is performing the procedure. Further, it would be advantageous for a user to view on a wireless device visualizations, such as animations or video clips illustrating how to perform the procedure and other additional information relating to the procedure before the procedure is performed or during the event.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for providing instructions for a procedure on a wireless device. The method may include receiving a visualization scenario for a procedure based upon a current context of a wireless device. The method may also include obtaining messages defining the visualization scenario. Further, the method may include presenting the messages defining the visualization scenario on the wireless device. In addition, the method may include receiving an indication of an occurrence of an event affecting the visualization scenario. The method may also include obtaining, based upon the occurrence of the event and the current context, messages defining a revised visualization scenario for the procedure. Moreover, the method may include presenting the messages defining the revised visualization scenario on the wireless device.

Another aspect relates to least one processor configured to provide instructions for a procedure on a wireless device. The processor may include a first module for receiving a visualization scenario for a procedure based upon a current context of a wireless device. The processor may additionally include a second module for obtaining messages defining the visualization scenario. The processor may further include a third module for presenting the messages defining the visualization scenario on the wireless device. In addition, the processor may include a fourth module for receiving an indication of an occurrence of an event affecting the visualization scenario. Furthermore, the processor may include a fifth module for obtaining, based upon the occurrence of the event and the current context, messages defining a revised visualization scenario for the procedure. In addition, the processor may include a sixth module for presenting the messages defining the revised visualization scenario on the wireless device.

Yet another aspect relates to a computer program product. The computer program product may include a computer-readable medium including at least a first set of codes for causing a computer to receive a visualization scenario for a procedure based upon a current context of a wireless device. The computer-readable medium may also include a second set of codes for causing the computer to obtain messages defining the visualization scenario. The computer-readable medium may additionally include a third set of codes for causing the computer to present the messages defining the visualization scenario on the wireless device. The computer-readable medium may also include a fourth set of codes for causing the computer to receive an indication of an occurrence of an event affecting the visualization scenario. The computer-readable medium may further include a fifth set of codes for causing the computer to obtain, based upon the occurrence of the event and the current context, messages defining a revised visualization scenario for the procedure. The computer-readable medium may also include a sixth set of codes for causing the computer to present the messages defining the revised visualization scenario on the wireless device.

Another aspect relates to an apparatus. The apparatus may include means for receiving a visualization scenario for a procedure based upon a current context of a wireless device. In addition, the apparatus may include means for obtaining messages defining the visualization scenario. The apparatus may also include means for presenting the messages defining the visualization scenario on the wireless device. Moreover, the apparatus may include means for receiving an indication of an occurrence of an event affecting the visualization scenario. Furthermore, the apparatus may include means for obtaining, based upon the occurrence of the event and the current context, messages defining a revised visualization scenario for the procedure. Additionally, the apparatus may include means for presenting the messages defining the revised visualization scenario on the wireless device.

Yet another aspect relates to an apparatus. The apparatus may include a visualization scenario manager component configured to receive a visualization scenario for a procedure based upon a current context of a wireless device. The apparatus may further include a visualization scenario requestor component configured to obtain messages defining the visualization scenario. In addition, the apparatus may include a presenter component configured to present the messages defining the visualization scenario on the wireless device. The apparatus may also include a visualization component configured to receive an indication of an occurrence of an event affecting the visualization scenario. The apparatus may additionally include an updator component configured to obtain, based upon the occurrence of the event and the current context, messages defining a revised visualization scenario for the procedure. In addition, the apparatus may include the presenter component configured to present the messages defining the revised visualization scenario on the wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details or with only a subset of these details.

The described aspects relate to methods and apparatus for providing visualization scenarios, such as a series of images, graphics, slide-shows, video frames and/or animations, on a mobile device for a selected procedure. The visualization scenarios may provide guidance, e.g., training, recommendation and/or instructions, to a user for actions the user should perform for the selected procedure. In addition, the methods and apparatus described herein may also include revising and/or updating the visualization scenarios based upon an occurrence of an event which alters and/or changes the procedure.

The system also is capable of enhancing the visualizations with augmented reality characteristics and features which can be overlaid on the visualizations either on-demand or in an adaptive manner. The augmented reality characteristics and features may aid the user in performing the task and/or deal with any unexpected events which may change the procedural context.

Figure 1:
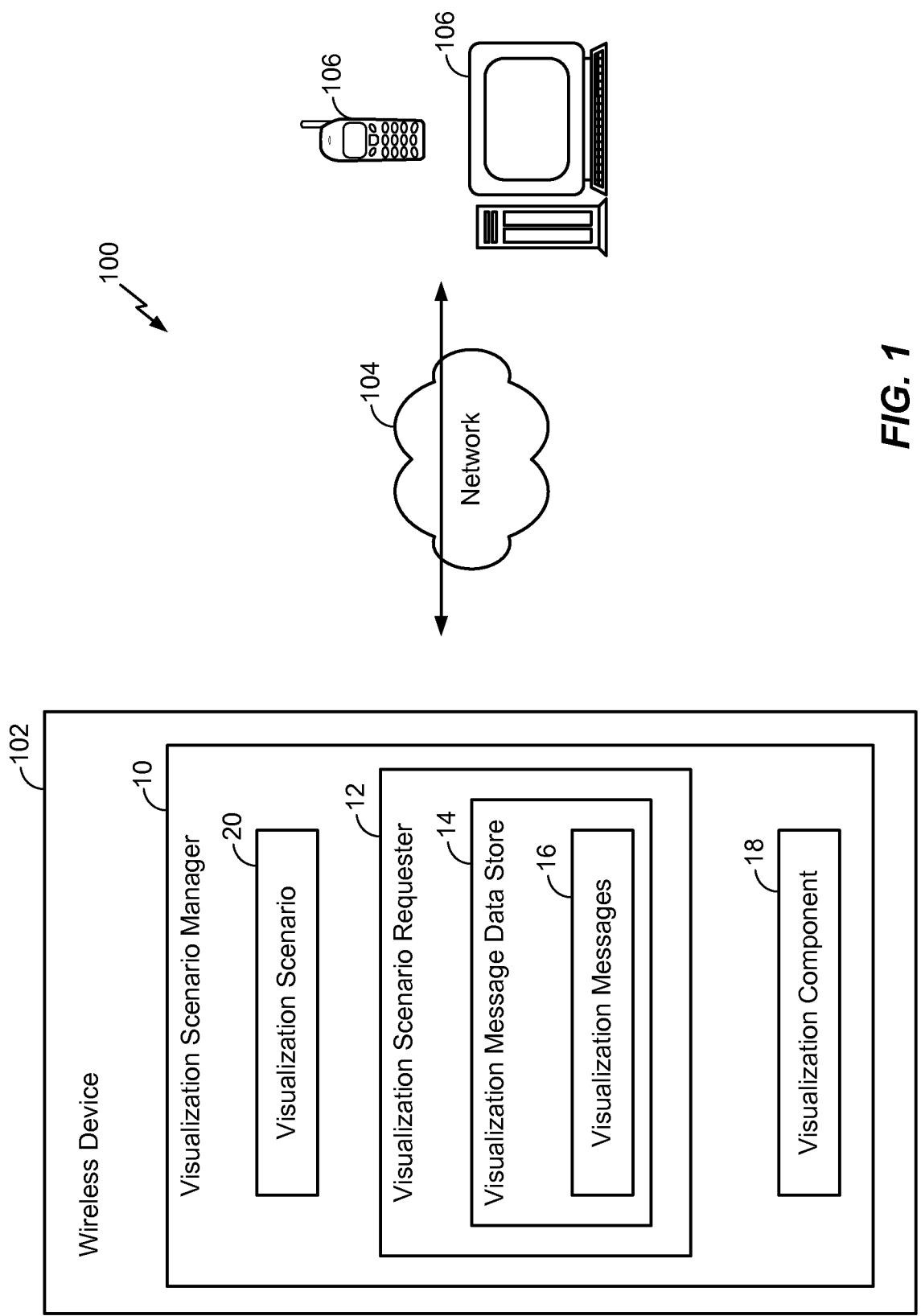
FIG. 1 is an illustration of a connectivity system in accordance with an aspect.

Turning now to FIG. 1, illustrated is an example connectivity system 100 that includes one or more wireless devices 102 communicating through one or more access networks 104 with one or more communication devices 106. Wireless device 102 may include any mobile or portable computing or communications device, such as a cellular device, that may connect to an access network 104. Wireless device 102 may be, for example, a cellular telephone, a navigation system, a computing device, a camera, a PDA, a music device, a gaming device or a handheld device having wireless connection capability, among other devices. In addition, communication device 106 may be, for example, a cellular telephone, a landline telephone, a navigation system, a computing device, a camera, a PDA, a music device, a gaming device or a handheld device having wireless connection capability, among other devices. Furthermore, access network 104 may provide one or more types of communication connections to wireless device 102 and communication device 106. Wireless device 102 may place and/or receive a communication, e.g., a telephone call, a video conferencing call, an Internet Protocol session, such as a SKYPE™ session, a voice over internet protocol (IP) call, a short message service (SMS) message, a multimedia messaging service (MMS) message, an instant messaging (IM) service message, a chat or net-meeting related connection, a video, music, or data transfer, among other communications, via access network 104 to one or more communication devices 106. In addition, wireless device 102 may receive a communication via access network 104 from one or more communication devices 106.

Figure 2:
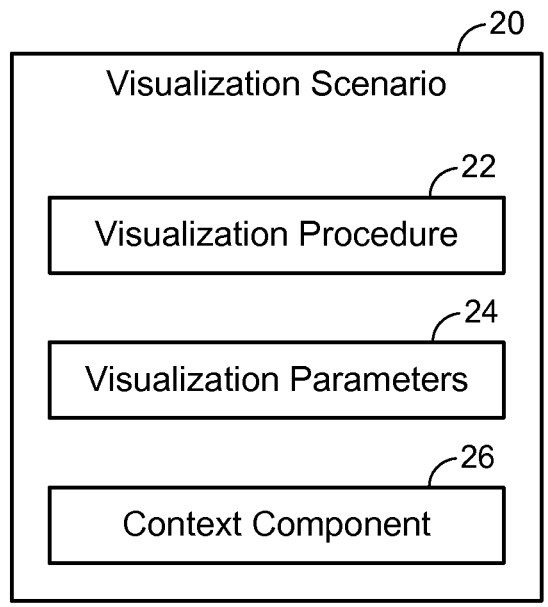
FIG. 2 is an illustration of an example visualization scenario component operable within a mobile device in accordance with an aspect.

Wireless device 102 may include a visualization scenario manager 10 operable for receiving a visualization scenario 20, such as, but not limited to, one or more of a series of images, graphics, slide-shows, video frames, animations, audio instructions, or interactive animations for providing guidance and/or instructions for a visualization procedure 22 (FIG. 2). For example, the visualization scenario manager 10 may receive inputs from a user selecting the visualization procedure 22. Turning now to FIG. 2, the visualization procedure 22 may include, but is not limited to, a health-care procedure (e.g., a surgical operation), a transportation procedure (e.g., an automobile repair, such as replacing a component of an automobile, changing a tire, or fixing a broken automotive part), an educational procedure (e.g., a laboratory experiment), an entertainment procedure (e.g., replaying a scene from a movie or drama before acting and/or performing the scene), a sports procedure (e.g., reviewing certain game-plans and/or sports-clips during and/or before a game), or a business procedure, or any other procedure that may be performed by a user in range to view or hear the wireless device 102.

In addition, the visualization scenario 20 may include a context component 26 operable of determining a current context of the user. The current context may include information relating to the current situation and/or environment of the user and/or the wireless device 102. For example, the current context may include, but is not limited to, a time value, a location, the season, date information, e.g., day, month and year, and weather information. For a medical procedure the current situation or environmental information may include, but is not limited to, the user's location information, the time of day, the patient's history and/or family history, the patient's age and/or physical condition, the type of disease and/or condition, the stage of the disease, the type of instruments available for performing the procedure and the conditions of the room where the procedure may take place, among other contextual inputs regarding the visualization procedure. For example, the content component 26 may include or receive inputs from other wireless device components or sensors, such as but not limited to a clock, a position location module, a camera, a microphone, a thermometer, a memory or database, a wired or wireless communication interface, a keypad, or a touch sensitive display, among others sources of input. In addition, the content component 26 may receive inputs from the user, such as receiving images, videos, text or audio embodying the user's current context. It should be appreciated that the current context may be tailored for the requested visualization procedure 22. For example, an automotive procedure or lab experiment may have additional and/or different contextual inputs that are relevant to the selected visualization procedures.

The visualization scenario 20 may further include visualization parameters 24 defining the visualization procedure 22 based upon the determined current context. The visualization parameters 24 may include, but are not limited to, desired length of the video-clip (e.g., 2-3 sec clip), number of images or slides (e.g., 10 images maximum), with or without audio commentary, special keyword or keywords, e.g., "must show how to remove blockage in an artery" or "how to insert a catheter into a woman's bladder under special medical situations, such as early-stage pregnancy," the make and model of the wireless device on which the visualization scenario would be displayed, e.g., "my iPhone™, iPad™ or Blackberry Storm II™" and various functional parameters such as, zoom, pause, rewind, fast-forward, contrast enhancement, among other parameters.

Referring back to FIG. 1, wireless device 102 may further include a visualization scenario requestor 12 operable for requesting the visualization scenario 20 from one or more communication devices 106. The visualization scenario requestor 12 may include a visualization message data store 14 operable for storing the received visualization messages 16 defining the visualization scenario 20. It should be appreciated that the visualization messages 16 may be retrieved from the data store 14 to be presented on-demand to a user upon receipt of a request from the user to display the visualization messages 16. In addition and/or alternatively, the user may forward the received visualization messages 16 to one or more other users. The visualization messages 16 may include information for performing the visualization procedure 22 (FIG. 2). The messages may include, but are not limited to, a series of images, video frames, animations, and illustrations providing recommendations and/or guidance for performing the visualization procedure 22. It should be appreciated that the visualization messages 16 may also include text messages and/or audio providing recommendations and/or guidance for performing the visualization procedure 22.

In addition, wireless device 102 may include a visualization component 18 operable for receiving the visualization messages 16 illustrating the visualization scenario and displaying the visualization messages 16 on wireless device 102. It should be appreciated that the visualization messages 16 may be displayed on mobile device 102 on demand while performing the visualization procedure 22 if necessary.

In an aspect, visualization component 18 may include a presenter 30 (FIG. 3) component operable for displaying the received visualization messages 16, such as a series of images, video frames and/or animations for performing the visualization procedure 22 on mobile device 102. The visualization messages 16 may be presented to the user, for example, on-demand (e.g., when a user requests the visualization), based on an alarm condition ("profuse bleeding", "heart-rate dropping", etc.), during a predetermined/preset time period ("at half-time during the sports-event"), or based upon sensory data (e.g., the presenter displays the data automatically based upon readings from sensors within the wireless device). In an aspect, the visualization messages 16, including the images, video-clips, graphics, animations etc. may be presented based on a time-sequence, e.g., a chronological manner, or based on a variety of other parameters. One such parameter may include, for example, a location parameter (e.g., where the visualization images and videos from the same location are displayed first). It should also be appreciated that the visualization images and videos may also be projected to a larger display from the communication device for easier viewing.

Figure 3:
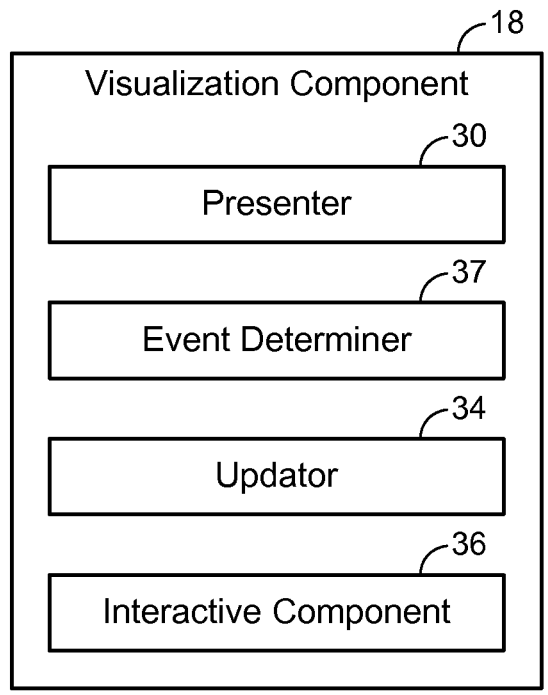
FIG. 3 is an illustration of an example visualization component operable within a mobile device in accordance with an aspect.

Referring now to FIG. 3, the visualization component 18 may further include components operable for revising and/or updating the visualization scenario 20 based upon an occurrence of an event which may alter and/or change the desired visualization procedure 22. Visualization component 18 may include an event determiner component 32 operable for detecting an occurrence of an event which may alter and/or change the desired visualization scenario 20 (FIG. 1). In addition, visualization component 18 may also include an updator component 34 operable for updating and/or revising the visualization scenario 20, as illustrated in FIG. 4.

Figure 4:
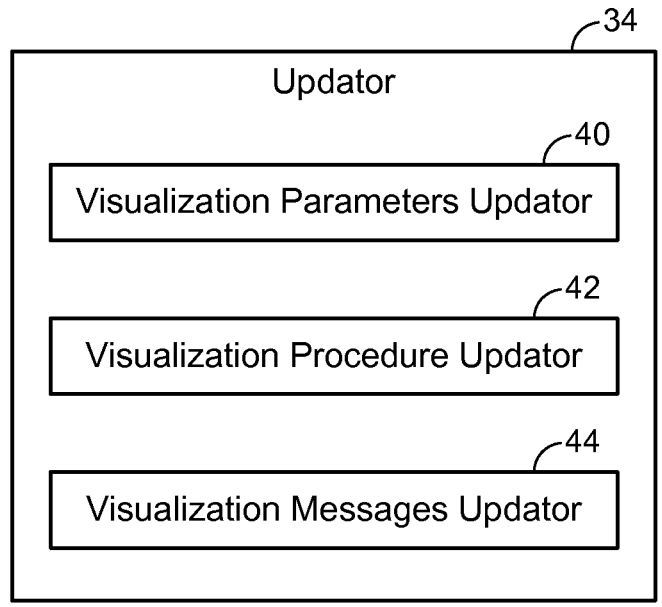
FIG. 4 is an illustration of an example updator component operable within a mobile device in accordance with an aspect.

Turning now to FIG. 4, the updator component 34 may include a visualization parameters updator component 40 operable for updating the visualization parameters. In addition, the updator component 34 may further include a visualization procedure updator component 42 operable for updating the desired visualization procedure. Moreover, the updator component 34 may include a visualization messages updator component 44 operable for updating the visualization messages illustrating the visualization scenario 20 (FIG. 1) based upon the updated parameters and/or the updated procedure.

Figure 5:
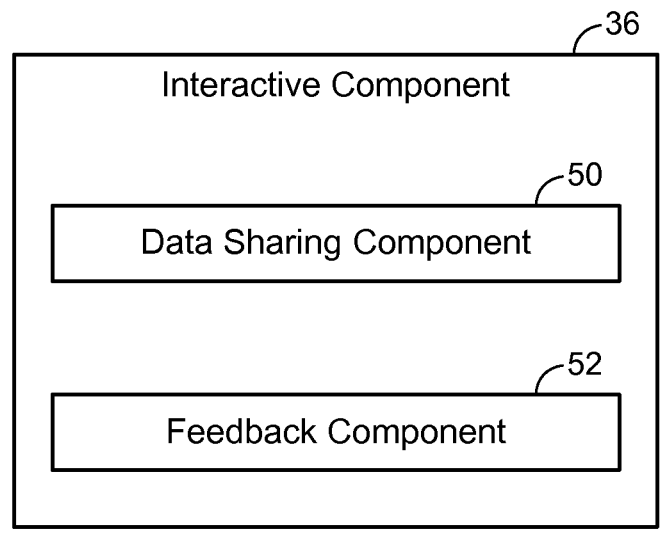
FIG. 5 is an illustration of an example interactive component operable within a mobile device in accordance with an aspect.

Referring back to FIG. 3, the visualization component 18 may also include an interactive component 36 operable for soliciting feedback on data provided to other users regarding the visualization scenario 20 (FIG. 1). For example, the data may include information relating to the occurrence of the event that may alter and/or change the visualization scenario 20. The interactive component 36 may include a data sharing component 50 (FIG. 5) operable for sharing the data relating to the visualization scenario 20 with other users. For example, the data sharing component 50 may send pictures and/or video of the visualization procedure 22 (FIG. 2) and/or events that occur while performing the visualization procedure 22 to other users participating in the same SKYPE™ session or the video conference call. In addition, the interactive component 36 may further include a feedback component 52 operable for receiving feedback relating to the data that was shared from other users. The feedback may be provided via, for example, a video conference with the other users, an IP session, a VoIP call, a telephone call, a short message service (SMS) message, a Twitter message, or a multimedia messaging service (MMS) message, among other communication methods.

Thus, the data sharing component may interact with the updator component 34 and the event determiner component 37 for updating and/or revising the visualization procedure 22 based upon the feedback provided by the feedback component 52. It should be appreciated that providing the data regarding the event to the other users and updating the visualization procedure based upon the received feedback may occur in near real-time.

Figure 6:
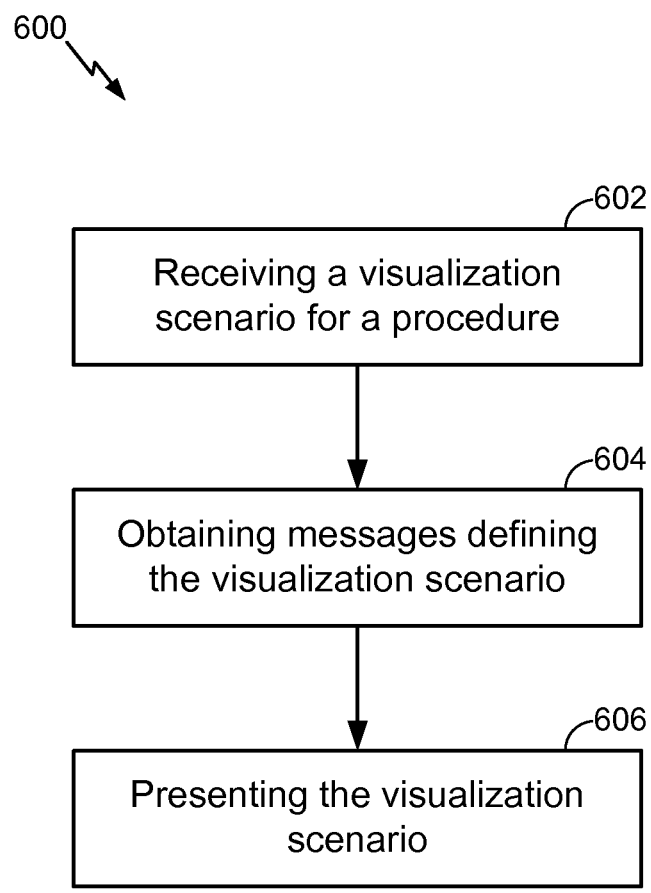
FIG. 6 is a flow chart illustrating a method for presenting a visualization scenario at a mobile device in accordance with yet another aspect.

Referring now to the flow chart 600 in FIG. 6, an aspect of a method for presenting a visualization scenario for a procedure includes, at 602, receiving a visualization scenario for the procedure. In an aspect, the wireless device may receive inputs from a user selecting the procedure. As discussed above, the procedure may include, but is not limited to, a medical operation and/or medical diagnosis procedure, an automobile repair, or a lab experiment performed in a classroom, among other procedures.

In addition, the visualization scenario for the desired procedure may be based upon a current context, e.g., a user's current situation, such as location information, the time of day, environmental context, or pre-existing information regarding the procedure. For example, for a medical procedure, the current context may include, but is not limited to, inputs regarding the patient's medical history, the patient's age and physical condition, gender, race, family history, or the type of disease of the patient and the stage of the disease (e.g., initial, advance, remission). It should be appreciated that a variety of information regarding the current content may be gathered in determining the visualization scenario for the desired procedure. In addition, the wireless device may have some apriori information regarding the desired procedure. For example, the wireless device may have a data store with additional information relating to the medical procedure, such as recommended procedures to perform for a specific condition. The apriori information may also be used along with the current context in determining the visualization scenario for the procedure. Next, at 604, the method may include obtaining messages defining the visualization scenario. For example, the wireless device may use the input regarding the visualization procedure, e.g., the current context and the apriori information, in obtaining messages that define the visualization scenario. The messages may include, but are not limited to, a series of images, graphics, slide-shows, video frames, animations, and/or a step-by-step visualization for providing guidance and/or recommendations to the user for the desired procedure. The messages may be obtained by the wireless device from a third party, e.g., another communication device and/or an access network. However, it should be appreciated that the wireless device may have a data store with messages previously stored defining the visualization scenario. Thus, it should be appreciated that the wireless device may obtain the messages defining the visualization scenario from a third party and/or from a data store on the wireless device.

It is also possible, depending on situations that the visualization scenario (and its series of images, videos, etc) may not be pulled by the user but instead will be pushed to the user by a human expert(s) or adaptively pushed by a remote computer, server or another device to the user's handset-client to provide required help or guidance to the user. Some situations may require visualization messages to be pushed and pulled in a prescribed sequence or at random.

At 606, the method may include presenting the visualization scenario. For example, the wireless device may display the messages defining the visualization scenario providing information to the user relating to the procedure. Displaying the messages, may include, for example, a video clip illustrating the steps for performing an operation in a virtual world. In an aspect, the messages may be displayed in an interactive manner. For example, before displaying portions of the visualization scenario, the wireless device may receive inputs from a user, e.g., on a touch sensitive display or keypad, selecting various portions of the visualization scenario for display. In addition, the wireless device may receive inputs from a user indicating a sequence and/or an order for displaying the visualization scenario. It should be appreciated that the user may view the visualization scenario on the wireless device prior to performing or the procedure. In addition, the user may view the visualization scenario on demand while performing the procedure if necessary.

Moreover, it should be appreciated that as the user performs the desired procedure, events and/or changes in time may affect the initial parameters, e.g., the current context, defining the visualization scenario for the desired procedure. Thus, it may be advantages to revise and/or update the visualization scenario based upon the events and/or changes in time, as illustrated in FIGS. 7 and 8.

Figure 7:
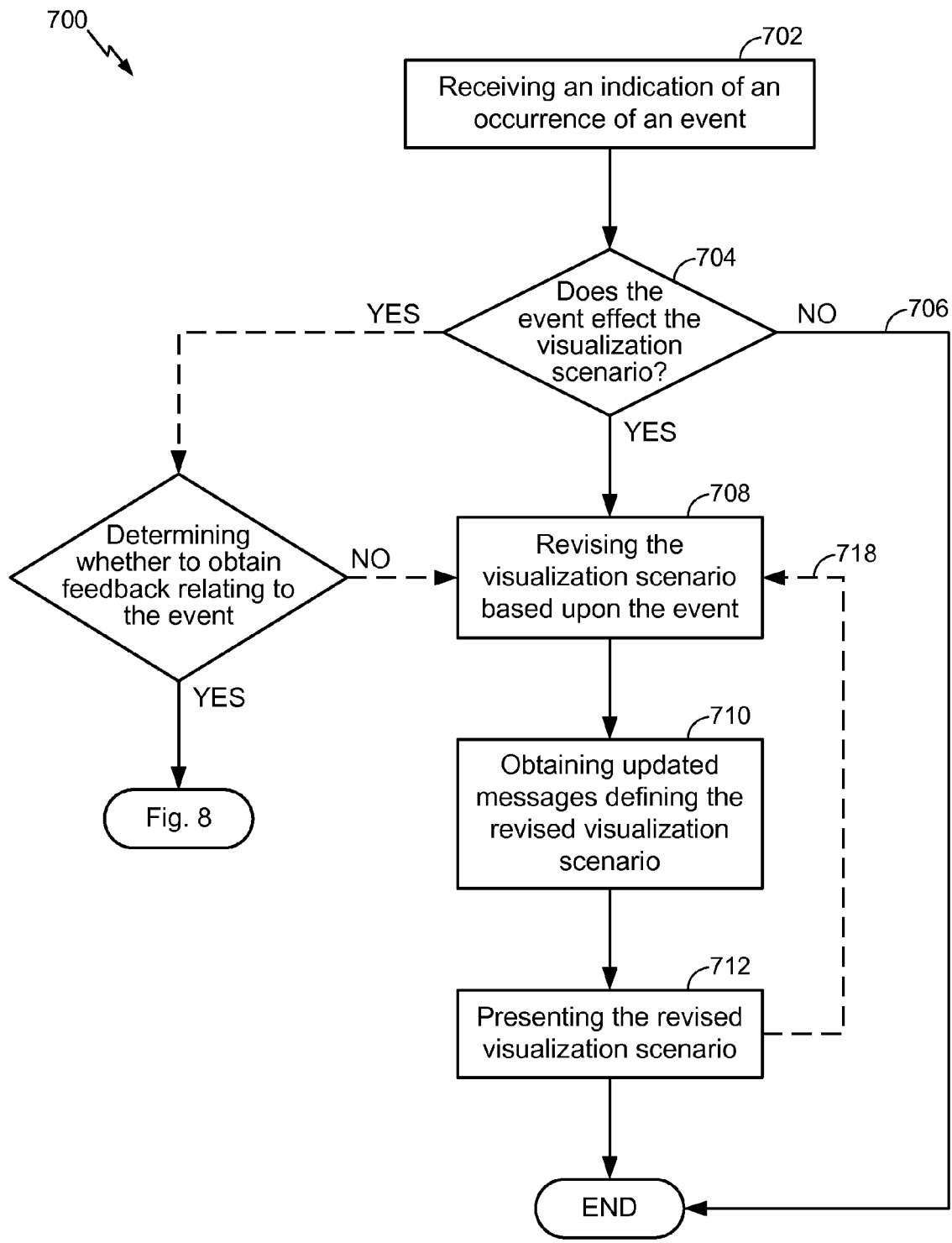
FIG. 7 is a flow chart illustrating a method for revising the visualization scenario in accordance with still another aspect.
Figure 8:
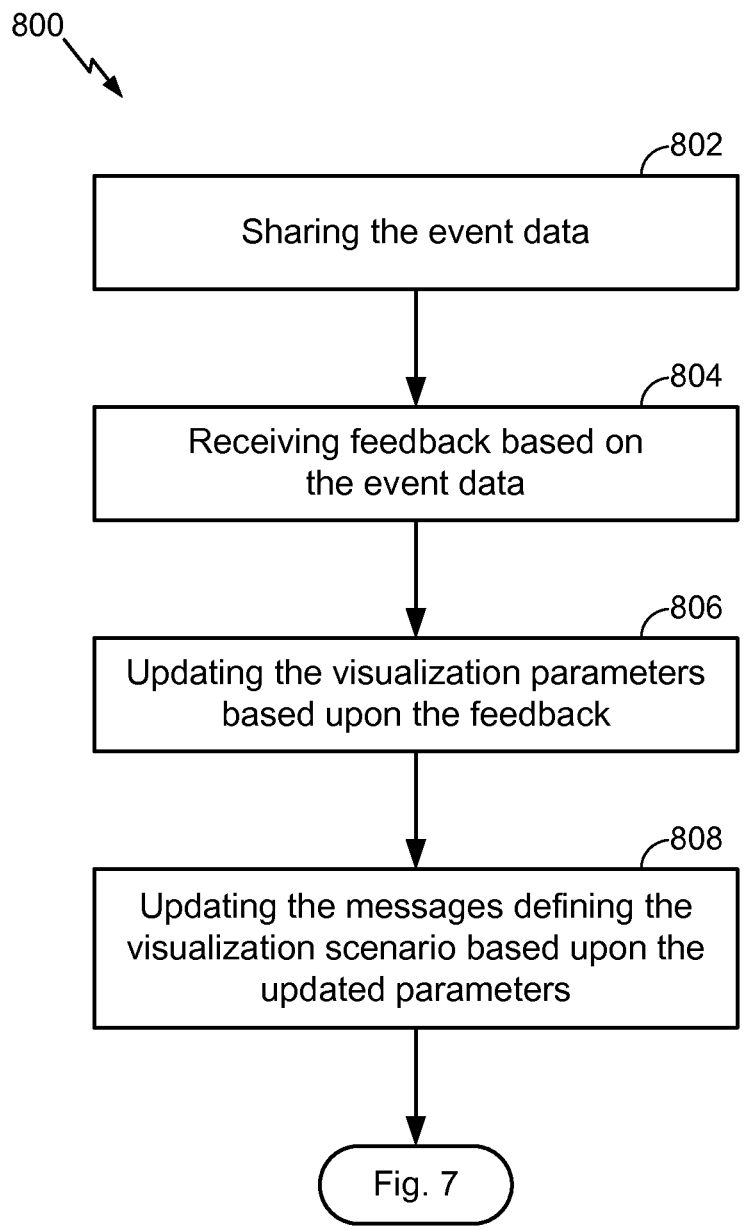
FIG. 8 is a flow chart illustrating a method for interactive feedback regarding the visualization scenario in accordance with another aspect.

Referring now to the flow chart 700 in FIG. 7, an aspect of a method for revising the visualization scenario includes, at 702, receiving an occurrence of an event, e.g., time varying contexts and/or event triggered contexts that may affect the visualization scenario. For example, as time progresses while performing the procedure, the current context may change and/or an event may occur that changes the initial parameters the visualization scenario was based upon. An event may include, but is not limited to, the patient's condition deteriorating as the procedure progresses, changing the location of the user, discovering an additional condition affecting the patient, complications in the procedure, or unexpected reactions of the patient to the procedure, among other events.

Next, at 704, the method may include determining whether the event affects the visualization scenario. If the event does not affect the visualization scenario, then, at 706, the method proceeds to the end and the current visualization scenario remains unchanged.

However, if the event does affect the visualization scenario, then at 708, the method includes revising the visualization scenario based upon the event. For example, if the occurrence of the event alters and/or changes the parameters the visualization scenario is based upon, the user may request that the wireless device updates and/or revises the visualization scenario. A user may speak and/or enter data into the wireless device, for example, requesting additional or revised information regarding the visualization scenario. Revising the visualization scenario may include, for example, updating the visualization parameters, e.g., the current context affecting the desired procedure. In addition, revising the visualization scenario may also include updating the visualization procedure. For example, if an event causes the visualization procedure to change, e.g., modify the procedure slightly and/or change entirely, then the visualization procedure may be updated. Furthermore, revising the visualization scenario may include updating the visualization messages based upon the changes in the parameters and/or the changes in the procedure. Thus, as the information effecting the visualization scenario dynamically changes, the visualization scenario is revised based upon the changes in information.

Next, at 710, the method may include obtaining updated messages defining the revised visualization scenario. For example, the wireless device may use the revised visualization scenario, e.g., revised parameters and the revised visualization procedure, in obtaining messages that define the visualization scenario based upon the current context. The messages may include, but are not limited to, a series of images, video frames, animations, and/or a step-by-step visualization for providing guidance and/or recommendations to the user for the revised procedure. The messages may be obtained by the wireless device from a third party, e.g., another communication device and/or a data store on the wireless device. It is also possible that during the visualization the user may change devices (e.g., switch from a device with a small display to another device with a larger display) to enable the user to see or understand the visualizations more clearly, without stopping the visualization process.

At 712, the method may further include presenting the revised visualization scenario. The revised visualization scenario may be displayed, for example, on the wireless device providing the user with a revised series of visualizations based upon the new context, e.g., the latest events combined with the original context. It should be appreciated that as the user reviews the revised visualization scenario that, at 718, the method may optionally return to 708 if the user decides to change and/or add additional visualization parameters before performing the revised visualization scenario. Thus, the user may edit the visualizations as necessary, e.g., delete and/or append the visualizations, changing and/or adding color, adding shading and/or texture to the visualizations, performing zooming, rotating, translating, pausing, forwarding and rewinding functions on the visualizations, compare the old visualizations (based on previous context) against the new visualizations (based on the changed context), store the visualizations or forward the visualizations to a third party or an external device, as necessary.

Optionally, at 714, the method may include determining whether to obtain feedback regarding the event. It should be appreciated that the feedback may include interactive feedback from other users in near real-time regarding the effect of the event on the visualization scenario. If feedback is not desired regarding the event, then the method may continue to 708. However, if feedback is desired regarding the event, then, at 716, the method continues to FIG. 8.

Referring now to flow diagram 800 in FIG. 8, an aspect of a method for interactive feedback includes, at 802, sharing the event data with another user. Sharing the event data with another user may include, but is not limited to, transmitting text and/or audio about the event captured by the wireless device, sending pictures of the event, providing video clips of the event, receiving a selection of the event from an interface on the wireless device, sending a short message service (SMS) message and/or a multimedia messaging service (MMS) message describing the event, participating in an Internet Protocol session, such as SKYPE™, participating in a chat or internet meeting related connection, such as Net Meetings™, or describing the event in a telephone call and/or a video conference call, among other methods of sharing data. It should be appreciated that the user may also share additional information relating to the procedure being performed by the user in addition to information relating to the event. The other users may include, but are not limited to, experts in the field, members of a virtual room, e.g., a medical community room, another doctor, an assistant, students in a classroom, among other individuals to share the data with.

Next, at 804, the method includes receiving feedback based upon the event. The feedback may include, but is not limited to, suggestions and/or recommendations for altering the visualization scenario based upon the occurrence of the event. The wireless device may receive the feedback from the other users, for example, via a video conference call, a Skype session, a telephone call, a SMS message, or a MMS message, or Instant Messaging (IM), among other communication methods. Thus, providing the data regarding the event to the other users and receiving the feedback based on the event may occur in near real-time.

At 806, the method may include updating the visualization parameters based upon the feedback. For example, the wireless device may use the received feedback to update and/or change the visualization parameters defining the visualization scenario as discussed in 708 of FIG. 7. Next, at 808, the method may also include updating the messages defining the visualization scenario based upon the updated visualization parameters. Thus, the visualization scenario may be updated based upon the received feedback from the other users. The method may continue to step 710 of FIG. 7, where the wireless device obtains updated messages defining the revised visualization scenario and to 712, where the method includes presenting the revised visualization scenario.

Figure 9:
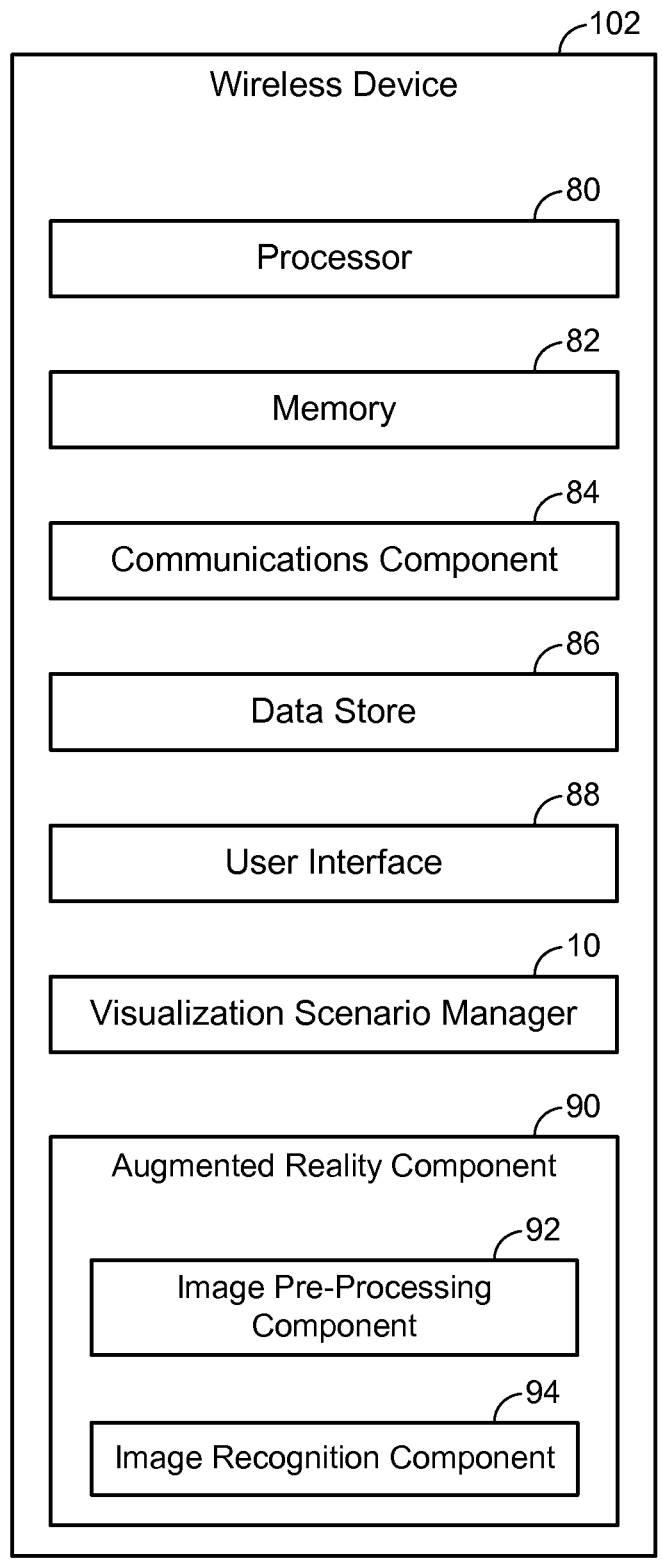
FIG. 9 is an illustration of an example wireless device operable within the connectivity system in accordance with an aspect.

Referring to FIG. 9, in one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include ay type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102, and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include a visualization scenario manager 10 (FIG. 1) operable for receiving a visualization scenario for a desired procedure and displaying visualization messages illustrating the visualization scenario. In addition, wireless device 102 may further include an augmented reality component 90 operable for overlaying features and/or characteristics on an image, e.g., the visualization messages illustrating the visualization scenario. Moreover, the augmented reality component 90 may further include an image pre-processing component 92 operable for performing pre-processing on a received image. The augmented reality component 90 may also include an image recognition component 94 operable for performing image recognition on a received image.

Figure 10:
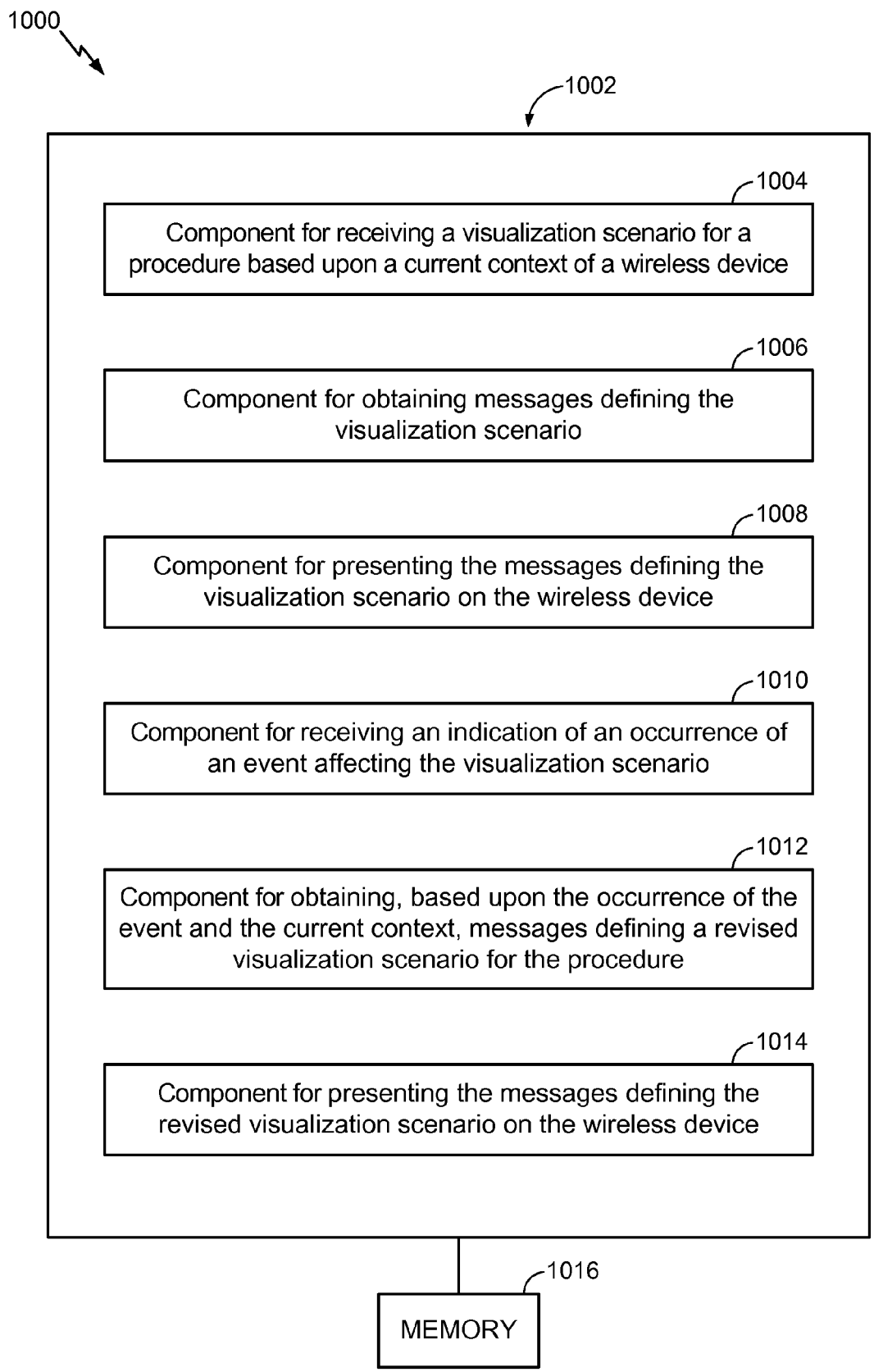
FIG. 10 is an illustration of an example system that facilitates managing content in accordance with yet another aspect.

Referring now to FIG. 10, illustrated is a system 1000 configured to manage content. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate providing instructions for a procedure on a wireless device. For instance, logical grouping 1002 may include component 1004 for receiving a visualization scenario for a procedure based upon a current context of a wireless device. Further, logical grouping 1002 may comprise component 1006 for obtaining messages defining the visualization scenario. In addition, logical grouping 1002 may include component 1008 for presenting the messages defining the visualization scenario on the wireless device. Logical grouping 1002 may also include component 1010 for receiving an indication of an occurrence of an event affecting the visualization scenario. Logical grouping 1002 may additional include component 1012 for obtaining, based upon the occurrence of the event and the current context, messages defining a revised visualization scenario for the procedure. Moreover, logical grouping 1002 may include component 1014 for presenting the messages defining the revised visualization scenario on the wireless device. Additionally, system 1000 can include a memory 1016 that retains instructions for executing functions associated with electrical components 1004, 1006, 1008, 1010, 1012 and 1014. While shown as being external to memory 1016, it is to be understood that one or more of electrical components 1004, 1006, 1008, 1010, 1012 and 1014 can exist within memory 1016.

While discussions of the aspects described above uses the medical field as an illustration, it should be appreciated that the aspects are not limited to the medical field and may be used in a variety of other areas. For example, one variation includes requesting a visualization scenario for a lab experiment in a classroom. The procedure may be an experiment a class is performing in a lab. The students may enter into the wireless device the parameters for the experiment and/or a current context of the classroom, e.g., the amount of chemicals to be used in the experiment, the temperature of the room, and the location of the classroom, among others information relating to the experiment and the context of the room. The students' wireless devices may obtain messages defining the experiment and display a visualization, e.g., animations, sequences of images or video clips, simulating the entire lab. During the lab, however, the instructor may introduce new parameters as the experiment progresses. Thus, the student's may obtain a revised visualization based upon the new parameters. In addition, the students may share the new parameters with other students across the world via, for example, virtual chat rooms, video conferencing and/or IP sessions. The students may receive feedback and/or suggestions for changing the experiment and/or the visualization scenario based upon the new parameters for the experiment.

Another variation includes requesting a visualization scenario for performing an automotive repair. For example, the desired procedure may be replacing an engine of an automobile. The mechanic may provide some information regarding the current context of the automobile, e.g., make, model, year and condition, to the wireless device. A visualization is displayed on the wireless device providing the mechanic a simulation of a procedure for replacing the engine. During the repair, however, the mechanic may discover new information regarding the automobile that affects the engine replacement, such as an undiscovered complication with the automobile. Thus, the wireless device combines the original contextual information along with the new uncovered information to provide and display an updated visualization scenario for replacing the engine of the automobile.

Figure 11:
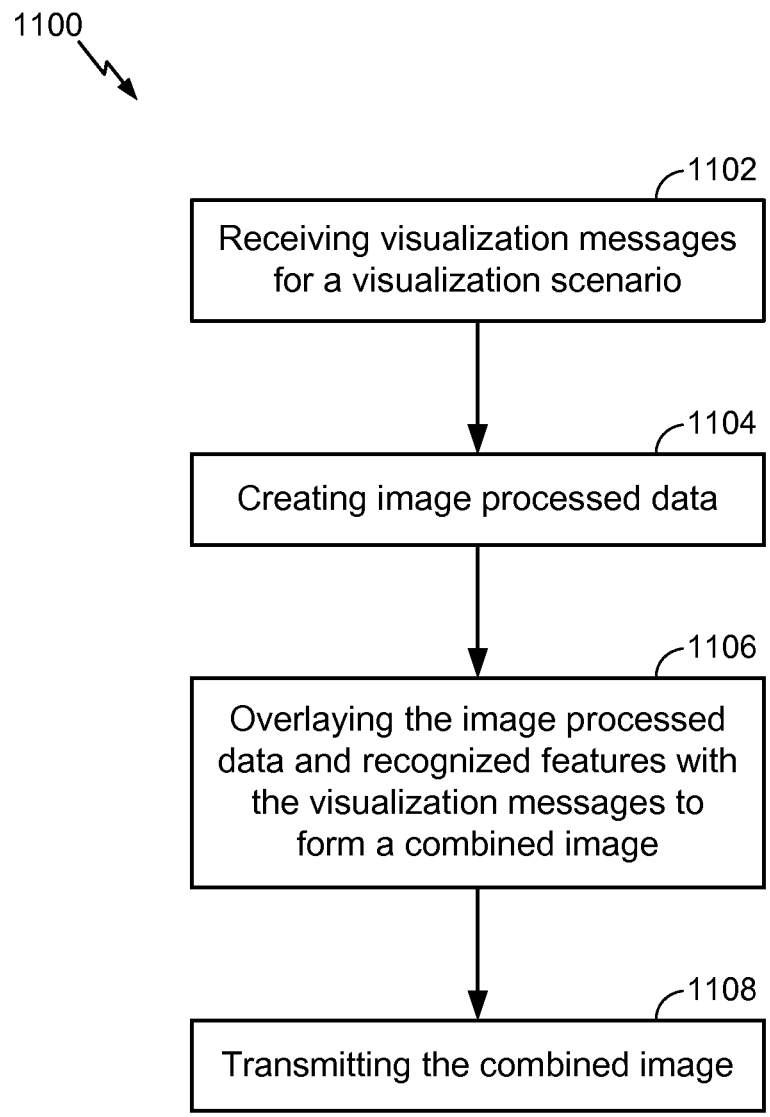
FIG. 11 is a flow chart illustrating a method for using augmented reality with a visualization scenario in accordance with still another aspect.

Yet another variation includes using augmented reality characteristics and/or features which may be overlaid on the visualizations. Referring now to the flow diagram 1100 illustrated in FIG. 11, a method for using augmented reality with a visualization scenario for a procedure in accordance with an aspect includes, at 1102, receiving visualization messages for a visualization procedure. For example, the wireless device may receive visualization messages which may include information for performing the visualization procedure, as discuss above.

In addition, the method may include, at 1104, creating image processed data, which may include performing image pre-processing and applying image recognition to the visualization messages. Image pre-processing may include, for example, processing additional information transmitted along with the received visualization messages. The additional information may include, but is not limited to, location information (e.g., a location where the image was captured or the location of the wireless device), date information, audio, or text, among other additional information. For example, an augmented reality component on the wireless device may include an image pre-processing component operable to perform the image pre-processing receive inputs containing the additional information from other wireless device components, such as, a camera, a position location module, a microphone, a memory or database, a touch sensitive display, among other sources of input.

In addition, the augmented reality component may include an image recognition engine operable for performing image recognition on the visualization messages. Image recognition may include, but is not limited to, recognizing objects in an image, such as landmarks, buildings, other individuals in the image, surgical equipment, automobiles, clothing, sporting equipment, furniture, plants, or animals, among other objects present in the image. It should be appreciated that the image recognition may occur automatically based upon automated recognition of portions and/or components of the visualization messages. Thus, the image processed data may include the objects recognized within the image and the additional information from the image pre-processing, or combination thereof.

Next, the method may include, at 1106, overlaying the image processed data and recognized features with the visualization messages to form a combined image which may include augmented reality features and/or characteristics.

The augmented reality features and characteristics may include, but are not limited to, audio, text, animations, or video, graphics, among other imagery. It should be appreciated that the combined image may replace a portion of the visualization messages or the entire set of visualization messages. For example, the augmented reality component may combine the visualization messages with the image processed data to form the combined image. The combined image may range from enhancing an image to recognition of certain components in the image, such as "a dirty O-Ring in a rocket assembly image" presented to a NASA engineer, "a fractured bone in a series of X-ray images" presented to a doctor, "a police car on your blind zone on the right" to a car driver, in the form of audio, text or additional visual features based on user-inquiries (on-demand) or otherwise.

The method may also include, at 1108, transmitting the combined image. For example, the wireless device may transmit the combined image for display to a user. The user may use the augmented reality characteristics and features for aiding the user in performing the visualization procedure and/or deal with any unexpected events which may change the procedural context. In addition, it should be appreciated that a third party may use augmented reality characteristics and/or features overlaid on the visualizations for providing feedback to the user relating to the visualization scenario and/or changes to the visualization scenario.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WCDMA, UMTS, HSPA, WI-FI, WIMAX, LTE and other systems, including satellite communications. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium which may be non-transitory, and which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

They may also use Operating systems such as, BREW, BREW Mobile Platform (BMP), J2ME (Java), Windows, LINUX, Symbian, MAC, Android or any other operating systems.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing instructions for a procedure on a wireless device, the method comprising:

receiving a visualization scenario, comprising a set of computer readable scenario parameters illustrating how to perform a procedure, wherein the visualization scenario is based on an image received from a wireless device that defines a current context of the wireless device;

obtaining first messages defining the visualization scenario;

presenting the first messages defining the visualization scenario on the wireless device;

receiving an indication of an occurrence of an event affecting the visualization scenario;

sharing information describing the event with a device of another user, wherein the sharing of information occurs in substantially real-time while performing the procedure;

receiving feedback from the device of the another user for revising the visualization scenario based upon the shared information, wherein receiving the feedback occurs in substantially real-time while performing the procedure;

obtaining, based upon the occurrence of the event, the feedback, and the current context, second messages with instructions for performing a revised visualization scenario for the procedure; and presenting the second messages on the wireless device.

2. The method of claim 1, wherein the procedure comprises one of a health-care procedure, an automobile repair procedure, an education procedure, an entertainment procedure, or a sports procedure, or any other procedure involving one or more tasks being performed by one or more users.

3. The method of claim 1, wherein the first messages comprises one of a video illustrating the procedure, an animation of the procedure, an interactive animation of the procedure, a series of images for the procedure, a slide show, graphics, text messages, audio, or any combination thereof.

4. The method of claim 1, wherein the current context further comprises the current context of a user of the wireless device.

5. The method of claim 4, further comprising:
receiving changes in the current context of the user through components on the wireless device; and
revising the second messages based on the changes in the current context of the user.

6. The method of claim 1, wherein the current context is one of a time value, a location, specific season, specific day, month and year, specific weather conditions, a patient's prior history, family history, a type of disease, a physical condition, a type of car, a part for a car, car's history, parameters for an experiment, a system design, a medical context, pharmaceutical context, automobile-related context, sports context, recreational context, entertainment context, retail context, business context, or education context, or any combination thereof.

7. The method of claim 1, wherein the occurrence of the event is based upon one of a change in time, a change in environment, a change in location, a change in the current context, an introduction of a new parameter, a deviation from the visualization procedure, or any combination thereof.

8. The method of claim 1, further comprising
revising the procedure based upon the received feedback.

9. The method of claim 1, wherein the feedback comprises augmented reality features in the form of one of sound, text, animations, video, graphics, or imagery, or any combination thereof.

10. The method of claim 1, wherein the sharing of information relating to the occurrence of the event further comprises one of sending pictures of the event, sending videos of the event, transmitting audio about the event captured by the wireless device, receiving a selection of the event from an interface on the wireless device, sending a short message service (SMS) message, sending a multimedia messaging service (MMS) message, using an Internet Protocol session, participating in a video conference call, instant-messaging, or any combination thereof.

11. The method of claim 1, wherein receiving the feedback further comprises one of participating in a video conference call, participating in an Internet Protocol session, receiving a telephone call, receiving a short message service (SMS) message, receiving a multimedia messaging service (MMS) message, or any combination thereof.

12. The method of claim 1, wherein presenting the first messages further comprises presenting the first messages in an interactive manner.

13. The method of claim 1, wherein presenting further comprises:
presenting the first messages based upon a presentation parameter, wherein the presentation parameter includes one of a time-sequence parameter or a location parameter.

14. The method of claim 1, further comprising:
editing the first messages, wherein the editing comprises one of deleting a part of the first messages, deleting an entire message, appending a part of the first messages, appending an entire first message, adding text, audio, video or graphics to the first messages, changing or adding color, shading and texture to the first messages, and performing zoom, rotate, translate, pause, forward, or rewind functions on the first messages.

15. The method of claim 1, further comprising:
storing the first messages on the wireless device; and
retrieving the stored first messages upon receiving a request from a user of the wireless device.

16. The method of claim 1, further comprising:
forwarding the first messages to one or more users.

17. The method of claim 1, wherein the presenting comprises one of presenting the first messages on demand, presenting the first messages based on an alarm condition, presenting the first messages based on a time period, presenting the first messages based on a third party pushing the first messages to the wireless device, or presenting the first messages based on sensory data, or any combination thereof.

18. The method of claim 1, wherein the presenting is configured based upon constraints of the wireless device.

19. The method of claim 18, wherein the configuration comprises remotely manipulating the images or videos to fit a display of the wireless device.

20. The method of claim 1, wherein the visualization scenario compromises augmented reality features and characteristics based on an automated recognition of parts or components in the first messages defining the visualization scenario.

21. The method of claim 1, further comprising:
applying augmented reality to the first messages defining the visualization scenario, wherein the augmented reality provides information regarding the current context or changes in the current context.

22. The method of claim 21, wherein the information provides one of assistance, guidance, aiding in problem solving, or teaching how to perform a certain task or series of tasks.

23. At least one processor configured to provide instructions for a procedure on a wireless device, the processor comprising:
a first module, comprising hardware, for receiving a visualization scenario, comprising a set of computer readable scenario parameters illustrating how to perform a procedure, wherein the visualization scenario is based on an image received from a wireless device that defines a current context of the wireless device;
a second module for obtaining first messages defining the visualization scenario;
a third module for presenting the first messages defining the visualization scenario on the wireless device;
a fourth module for receiving an indication of an occurrence of an event affecting the visualization scenario;
a fifth module for sharing information describing the event with a device of another user, wherein the sharing of information occurs in substantially real-time while performing the procedure;
a sixth module for receiving feedback from the device of the another user for revising the visualization scenario based upon the shared information, wherein receiving the feedback occurs in substantially real-time while performing the procedure;
a seventh module for obtaining, based upon the occurrence of the event and the current context, second messages with instructions for performing a revised visualization scenario for the procedure; and
an eighth module for presenting the second messages on the wireless device.

24. A computer program product, comprising:
a non-transitory computer-readable medium comprising:
a first set of codes for causing a computer to receive a visualization scenario illustrating how to perform a procedure, wherein the visualization scenario is based on an image received from the wireless device that defines a current context of the wireless device;
a second set of codes for causing the computer to obtain first messages defining the visualization scenario;
a third set of codes for causing the computer to present the first messages defining the visualization scenario on the wireless device;
a fourth set of codes for causing the computer to receive an indication of an occurrence of an event affecting the visualization scenario;
a fifth set of codes for causing the computer to share information describing the event with a device of another user, wherein the sharing of information occurs in substantially real-time while performing the procedure;
a sixth set of codes for causing the computer to receive feedback from the device of the another user for revising the visualization scenario based upon the shared information, wherein receiving the feedback occurs in substantially real-time while performing the procedure;
a seventh set of codes for causing the computer to obtain, based upon the occurrence of the event and the current context, second messages with instructions for performing defining a revised visualization scenario for the procedure; and
an eighth set of codes for causing the computer to present the second messages on the wireless device.

25. An apparatus comprising:
means for receiving a visualization scenario illustrating how to perform a procedure, wherein the visualization scenario is based on an image received from the wireless device that defines a current context of the wireless device;
means for obtaining first messages defining the visualization scenario;
means for presenting the first messages defining the visualization scenario on the wireless device;

means for receiving an indication of an occurrence of an event affecting the visualization scenario;

means for sharing information describing the event with a device of another user, wherein the sharing of information occurs in substantially real-time while performing the procedure;

means for receiving feedback from the device of the another user for revising the visualization scenario based upon the shared information, wherein receiving the feedback occurs in substantially real-time while performing the procedure;

means for obtaining, based upon the occurrence of the event and the current context, second messages with instructions for performing a revised visualization scenario for the procedure; and means for presenting the second messages on the wireless device.

26. An apparatus, comprising:

a visualization scenario manager component configured to receive a visualization scenario illustrating how to perform a procedure, wherein the visualization scenario is based on an image received from the wireless device that defines the current context of the wireless device;

a visualization scenario requestor component configured to obtain first messages defining the visualization scenario;

a presenter component configured to present the first messages defining the visualization scenario on the wireless device;

a visualization component configured to receive an indication of an occurrence of an event affecting the visualization scenario;

an interactive component configured to share information describing the event with a device of another user, wherein the sharing of information occurs in substantially real-time while performing the procedure;

the interactive component configured to receive feedback from the device of the another user for revising the visualization scenario based upon the shared information, wherein receiving the feedback occurs in substantially real-time while performing the procedure;

an updator component configured to obtain, based upon the occurrence of the event and the current context, second messages with instructions for performing a revised visualization scenario for the procedure; and the presenter component configured to present the second messages on the wireless device.

27. The apparatus of claim 26, wherein the procedure comprises one of a health-care procedure, an automobile repair procedure, an education procedure, an entertainment procedure, or a sports procedure, or any other procedure involving one or more tasks being performed by one or more users.

28. The apparatus of claim 26, wherein the first messages comprises one of a video illustrating the procedure, an animation of the procedure, an interactive animation of the procedure, a series of images for the procedure, a slide show, graphics, text messages, audio, or any combination thereof.

29. The apparatus of claim 26, wherein the current context further comprises the current context of a user of the wireless device.

30. The apparatus of claim 29, wherein the visualization component is further configured to receive changes in the current context of the user through components on the wireless device and to revise the second messages based on the changes in the current context of the user.

31. The apparatus of claim 26, wherein the current context is one of a time value, a location, specific season, specific day, month and year, specific weather conditions, a patient's prior history, family history, a type of disease, a physical condition, a type of car, a part for a car, car's history, parameters for an experiment, a system design, a medical context, pharmaceutical context, automobile-related context, sports context, recreational context, entertainment context, retail context, business context, or education context, or any combination thereof.

32. The apparatus of claim 26, wherein the occurrence of the event is based upon one of a change in time, a change in environment, a change in location, a change in the current context, an introduction of a new parameter, a deviation from the visualization procedure, or any combination thereof.

33. The apparatus of claim 26, further comprising
the updator component is configured to revise the procedure based upon the received feedback.

34. The apparatus of claim 26, wherein the feedback comprises augmented reality features in the form of one of sound, text, animations, video, graphics, or imagery, or any combination thereof.

35. The apparatus of claim 26, wherein the interactive component is further configured to share information relating to the occurrence of the event via one of sending pictures of the event, sending videos of the event, transmitting audio about the event captured by the wireless device, receiving a selection of the event from an interface on the wireless device, sending a short message service (SMS) message, sending a multimedia messaging service (MMS) message, using an Internet Protocol session, participating in a video conference call, instant-messaging, or any combination thereof.

36. The apparatus of claim 26, wherein the interactive component is further configured to receive feedback via one of participating in a video conference call, participating in an Internet Protocol session, receiving a telephone call, receiving a short message service (SMS) message, receiving a multimedia messaging service (MMS) message, or any combination thereof.

37. The apparatus of claim 26, wherein the presenter is further configured to present the first messages in an interactive manner.

38. The apparatus of claim 26, wherein the presenter is further configured to:
present the first messages based upon a presentation parameter, wherein the presentation parameter includes one of a time-sequence parameter or a location parameter.

39. The apparatus of claim 26, where in the visualization component is further configured to:
edit the first messages, wherein the editing comprises one of deleting a part of the first messages, deleting an entire first message, appending a part of the first messages, appending an entire first message, adding text, audio, video or graphics to the first messages, changing or adding color, shading and texture to the first messages, and performing zoom, rotate, translate, pause, forward, or rewind functions on the first messages.

40. The apparatus of claim 26, further comprising:
a visualization message data store configured to store the first messages on the wireless device; and
the visualization message data store further configured to retrieve the stored first messages upon receiving a request from a user of the wireless device.

41. The apparatus of claim 26, wherein the visualization scenario manager component is further configured to forward the first messages to one or more users.

42. The apparatus of claim 26, wherein the presenting comprises one of presenting the first messages on demand, presenting the first messages based on an alarm condition, presenting the first messages based on a time period, presenting the first messages based on a third party pushing the first messages to the wireless device, or presenting the first messages based on sensory data, or any combination thereof.

43. The apparatus of claim 26, wherein the presenter is further configured to present the messages based upon constraints of the wireless device.

44. The apparatus of claim 43, wherein the configuration comprises remotely manipulating the images or videos to fit a display of the wireless device.

45. The apparatus of claim 26, wherein the visualization scenario compromises augmented reality features and characteristics based on an automated recognition of parts or components in the first messages defining the visualization scenario.

46. The apparatus of claim 26, further comprising:
an augmented reality component configured to apply augmented reality to the first messages defining the visualization scenario, wherein the augmented reality provides information regarding the current context or changes in the current context.

47. The apparatus of claim 46, wherein the information provides one of assistance, guidance, aiding in problem solving, or teaching how to perform a certain task or series of tasks.

48. The method of claim 1, wherein the visualization scenario and the revised visualization scenario depict performance of the procedure in a virtual world simulating the current context of the wireless device.

49. The method of claim 1, wherein the one or more remote users are members of a virtual room.

50. The method of claim 1, wherein the event is an unexpected event.

51. The method of claim 1, wherein the first messages defining the visualization scenario comprise one or more of a visualization image, a video, a three-dimensional model, or a multi-dimensional model.

52. The method of claim 51, wherein the three-dimensional model and the multi-dimensional model are configured for manipulation in multiple directions.

53. The method of claim 51, wherein the visualization image comprises an augmented reality image.

54. The apparatus of claim 26, wherein the visualization scenario and the revised visualization scenario depict performance of the procedure in a virtual world simulating the current context of the wireless device.

55. The apparatus of claim 26, wherein the one or more remote users are members of a virtual room.

56. The apparatus of claim 26, wherein the event is an unexpected event.

57. The apparatus of claim 26, wherein the first messages defining the visualization scenario comprise one or more of a visualization image, a video, a three-dimensional model, or a multi-dimensional model.

58. The apparatus of claim 57, wherein the three-dimensional model and the multi-dimensional model are configured for manipulation in multiple directions.

59. The apparatus of claim 57, wherein the visualization image comprises an augmented reality image.

60. The method of claim 1, wherein the current context is tailored for the procedure by receiving different contextual inputs relevant to the procedure.

61. The apparatus of claim 26, wherein the current context is tailored for the procedure by receiving different contextual inputs relevant to the procedure.

62. The method of claim 1, wherein obtaining the first messages further comprises:
retrieving from a datastore of the wireless device apriori information regarding the procedure; and
using the apriori information and the current context to obtain the first messages defining the visualization scenario.

63. The apparatus of claim 26, wherein the visualization scenario requestor component is further configured to retrieve from a datastore of the wireless device apriori information regarding the procedure and use the apriori information and the current context to obtain the first messages defining the visualization scenario.

* * * * *